Oct. 9, 1962 J. L. WAITE 3,057,383
JIG FOR PORTABLE WOODWORKING TOOL
Filed Nov. 17, 1958 12 Sheets-Sheet 1

— FIG. 1. —

INVENTOR
John Leslie Waite
BY
Mead, Browne, Schuyler & Beveridge
ATTORNEYS

Oct. 9, 1962 J. L. WAITE 3,057,383
JIG FOR PORTABLE WOODWORKING TOOL
Filed Nov. 17, 1958 12 Sheets-Sheet 2

FIG. 2.

INVENTOR
John Leslie Waite
BY
Mead, Browne, Schuyler & Beveridge
ATTORNEYS

Oct. 9, 1962 J. L. WAITE 3,057,383
JIG FOR PORTABLE WOODWORKING TOOL
Filed Nov. 17, 1958 12 Sheets-Sheet 4

INVENTOR
John Leslie Waite
BY
Mead, Browne, Schuyler & Beveridge
ATTORNEYS Oct. 9, 1962  J. L. WAITE  3,057,383
JIG FOR PORTABLE WOODWORKING TOOL
Filed Nov. 17, 1958  12 Sheets-Sheet 5

INVENTOR
John Leslie Waite
BY
Mead, Browne, Schuyler & Beveridge
ATTORNEYS

FIG. 8.

Oct. 9, 1962 J. L. WAITE 3,057,383
JIG FOR PORTABLE WOODWORKING TOOL
Filed Nov. 17, 1958 12 Sheets-Sheet 7

—FIG. 9.—

INVENTOR
John Leslie Waite
BY
Mead, Browne, Schuyler & Beveridge
ATTORNEYS Oct. 9, 1962 J. L. WAITE 3,057,383
JIG FOR PORTABLE WOODWORKING TOOL
Filed Nov. 17, 1958 12 Sheets-Sheet 11

United States Patent Office 3,057,383
Patented Oct. 9, 1962

---

3,057,383
JIG FOR PORTABLE WOODWORKING TOOL
John Leslie Waite, West Kirby, Wirral, England, assignor to A. Robinson & Company Limited, Lancashire, England, a British company
Filed Nov. 17, 1958, Ser. No. 774,382
Claims priority, application Great Britain July 9, 1958
14 Claims. (Cl. 144—85)

The present invention relates to jigs primarily for the purpose of enabling woodwork pieces to be shaped with the aid of a portable hand tool, which may be manually operated or power driven, and is especially concerned with the shaping of two or a pair of workpieces of wood in a complementary fashion so as to enable them to be subsequently jointed to one another.

The present invention envisages the provision of a pair of workpiece-support members having workpiece-receiving surfaces extending in planes substantially at right-angles to one another, a guide member having at least one slot to slidably receive a co-operating guiding member in which is journalled a tool holder, means for locating said slotted guide member in a given position relative to at least one of the workpiece-receiving members whereby by relative movement of the guiding member and the slotted guide member, a rotating cutting tool carried by said tool holder can be moved along a given path in relation to a workpiece or workpieces positioned on either or both of said workpiece-receiving members to cut or shape it or them.

Said slotted guide member preferably extends substantially parallel to that one of the workpiece-receiving members to which it is connected and the guiding member is complementarily slotted so as to have a portion receivable in a slot in the guide member, both the guide member and guiding member having co-operating interenaging sliding surfaces adjacent their slotted portions so that when the guiding member is received in a slot of the guide member, the axis of the tool holder extends substantially at right-angles to that one of the work-supporting members to which the guide member is connected. The second of the work-supporting members preferably extends so as to have its work-receiving surface in a plane substantially at right-angles to the plane containing the work-receiving surface of the workpiece-receiving member to which the guide member is connected and substantially parallel to the axis of rotation of the tool holder when the guiding member is positioned in a slot in the guide member.

The guide member may be in the form of a comb, that is to say may be slotted to provide a plurality of spaced parallel slots opening along one edge of the member. If the cutting tool inserted in the tool holder has a frusto-conical form it is possible by moving the guiding member firstly down one slot on the guide member and then down another, and so on, to cause the cutting tool carried by the guiding member to cut a series of dovetail slots in an end portion of a workpiece received on the work-receiving surface of the work-receiving member to which the guide member is connected, or in the end portion of a workpiece received on the work-receiving surface of the other work-receiving member extending substantially at right-angles to the work-receiving surface of the work-receiving member to which the guide member is connected. By suitably positioning two workpieces on the work-receiving surfaces of both of the work-receiving members with the end of the workpiece on the work-supporting member to which the guide member is connected substantially abutting the edge of the surface of the other workpiece, it is possible simultaneously to cut complementary dovetail tongues and grooves in the two work-pieces to enable them to be subsequently jointed together with a dovetail joint.

If the guide member has a single slot extending generally transversely relatively to the workpiece-receiving member to which the guide member is connected, and such that when the guiding member is inserted therein the axis of the tool holder is substantially at right-angles to the plane containing the workpiece-receiving surface of that workpiece receiving member, it is possible by using a rotating cutting tool of frusto-conical shape to cut a dovetail groove in one workpiece. By positioning the second workpiece on the work-receiving surface of the other work-receiving member and locating said work-receiving surface successively at two appropriate heights in relation to the slot on the guide member, it is also possible to cut a V-shaped groove in each of the opposite surfaces of the workpiece so as to provide a tongue which is receivable in the dovetail groove cut in the one workpiece. The second tongued workpiece can thus be slid into the dovetail groove and this is advantageous in the construction of shelving.

The invention will be further described with reference to the accompanying drawings which illustrate several embodiments of the invention by way of example only and in which.

Throughout the several views like characters of reference have been used to denote like or equivalent parts wherever they occur.

Referring first to FIGS. 1 to 5 of the drawings, the jig comprises a pair of workpiece support members 10 and 11 connected together so that a flat horizontal work-receiving surface 10a of the member 10 lies at right-angles to a flat vertical work-receiving surface 11a of the member 11. The member 10 is a metal casting having a horizontally extending top plate 10b, which provides the work-receiving surface 10a, and two integral bracket arms 10c extending downwardly therefrom with their front vertical faces at right-angles to the surface 10a of top plate 10b, said bracket arms 10c being spaced apart one adjacent each side of the top plate 10b. The top plate 10b also has two workpiece-locating studs 12 spaced apart adjacent one side of the top plate and projecting upwardly from the surface 10a thereof. The front vertical face of each bracket arm 10c has two guide studs 13 projecting therefrom in spaced vertical alignment.

Figure 1:
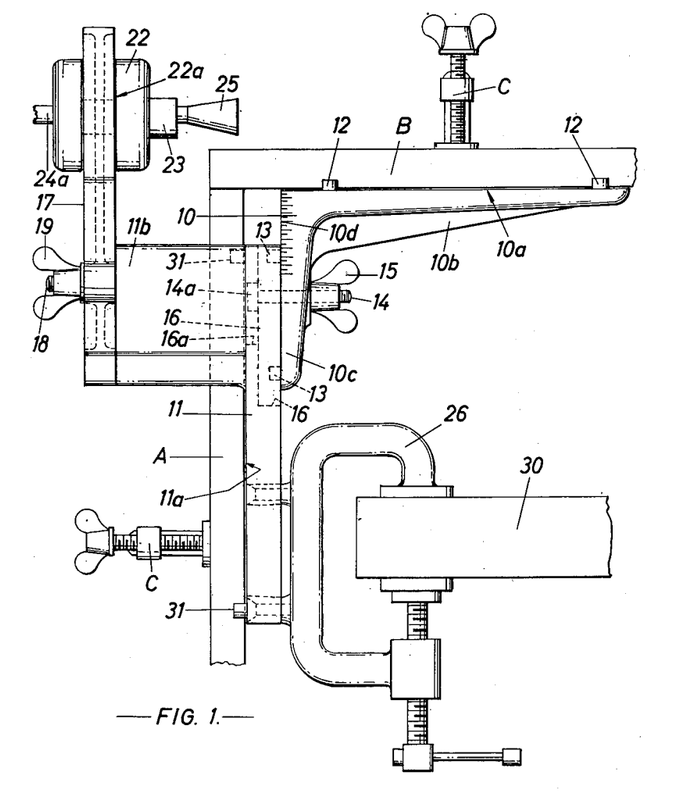
FIG. 1 is a side elevation of a jig according to the first embodiment.

The workpiece support member 10 just described is supported for vertical adjustment relatively to the other workpiece support member 11 by means of two threaded bolts or studs 14 fitted with wing nuts 15. Each bolt or stud 14 is located in a clearance hole in one of the bracket arms 10c of the top plate 10b and extends through an aligned vertical slot 16 formed in the rear face of the workpiece support member 11. As shown in FIG. 1, the slot 16 opens at the top of the support member 11 and extends forwardly part-way through the thickness of the member 11 to open into a wider slot 16a which extends through the remainder of the thickness of the member 11. The slot 16a also opens at the top of the support member 11 but its bottom closed end is disposed at a somewhat higher level than the bottom end of the slot 16. When the workpiece support members 10, 11 are assembled together, the two guide studs 13 on the bracket arms 10c of the member 10 are slidably engaged in the slot 16 whilst a head 14a of the bolt or stud 14 is similarly engaged in the wider slot 16a. It will be appreciated that when the wing nuts 15 are slackened off, the workpiece support member 10 can be raised or lowered relatively to the workpiece support member 11. The lowermost position of the workpiece support member 10 is determined by abutment of the lower guide stud 13 with the closed bottom end of the slot 16. A suitable scale may be provided between the workpiece support members 10 and 11 in order to ensure accurate adjustment between these parts. In this example, such a scale is shown at 10d in FIG. 1.

Figure 2:
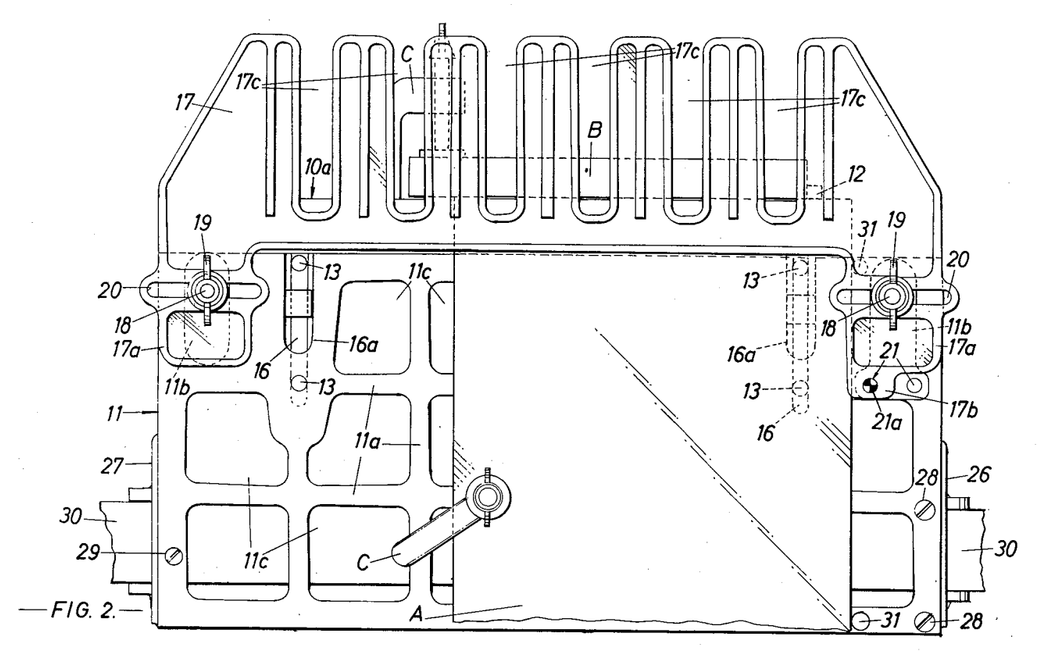
FIG. 2 is a corresponding front view.
Figure 3:
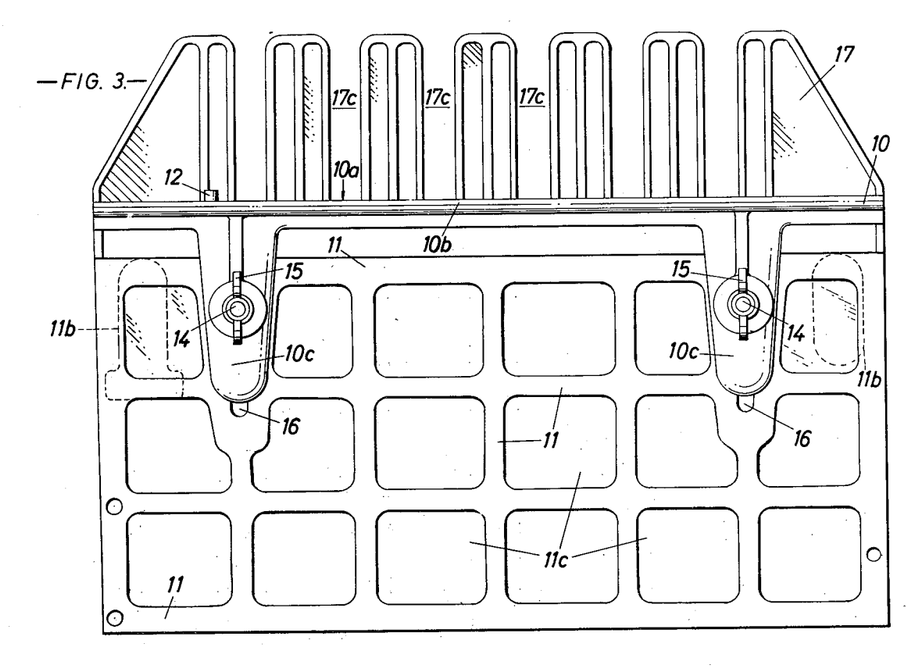
FIG. 3 is a corresponding rear view.
Figure 4:
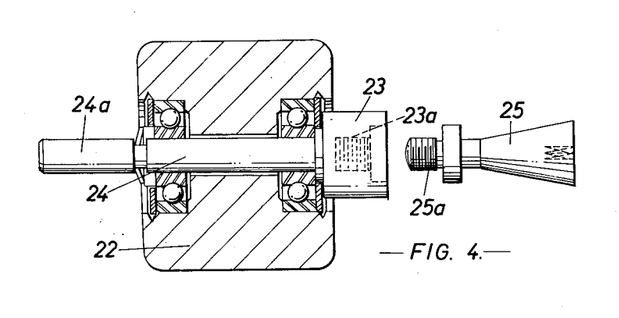
FIG. 4 is a sectional elevation, drawn to an enlarged scale as compared with the preceding views, of the guiding member which carries the chuck or tool holder for the cutting tool, the cutting tool being shown detached from the chuck.
Figure 5:
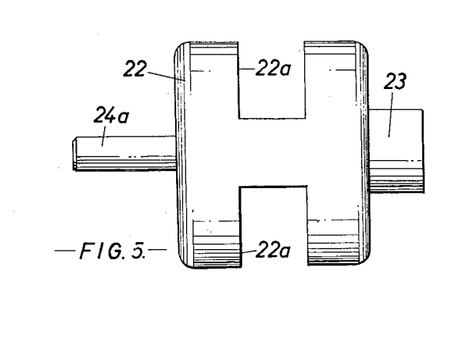
FIG. 5 is a plan view of FIG. 4, omitting the cutting tool.

The workpiece support member 11 has two lugs or bosses 11b extending forwardly from its front work-receiving face 11a and disposed one adjacent each side thereof. A guide member 17 is detachably and adjustably secured to the front end faces of the lubs 11b by means of a pair of threaded studs 18 screwed into the lugs 11b and provided with wing nuts 19. The studs 18 pass through horizontal slots 20 formed in downward extensions 17a of the member 17, which extensions 17a coincide with the lugs 11b. As seen in FIG. 2, the right-hand extension 17a has a further downward extension 17b which carries a locating stud 21a adapted to engage in one or other of a pair of horizontally spaced holes 21 provided in the front face of the related lug 11b; the arrangement being such that when the wing nuts 19 are slackened off, the guide member 17 can be displaced horizontally relatively to the workpiece support members 10 and 11 and re-locked thereto by insertion of the pin 21a in one or other of the locating holes 21.

The upper part of the guide member 17 is of comblike construction and provides a plurality of spaced parallel slots 17c which extend downwardly from the top edge of the guide member 17 and terminate somewhat below the level of the work-receiving surface 10a of the top plate 10b. The purpose of the slots 17c is to receive and guide a cooperating guiding member 22 which is shown applied to the member 17 in FIG. 1 and detached in FIGS. 4 and 5. Journalled in the guiding member 22 is a tool holder 23 with driving spindle 24 which may be rotated by applying any convenient portable hand tool, which may be manually operated or power driven, to the projection 24a of the spindle 24. The tool holder 23 has a screw-threaded socket 23a for receiving a correspondingly threaded shank 25a of a cutting tool 25 of frusto-conical shape. The guiding member 22 is provided with a through slot 22a down each side. The extent of the slots 22a inwardly of the guiding member 22 is just sufficient to enable the member 22 to be slid down in one or other of the slots 17c of the guide member 17, whilst the pitch of the slots 17c in the guide member 17 and the depth of the slots 22a in the guiding member 22 are such as to provide adequate interengaging sliding surfaces between the members 17 and 22 so that when the member 22 is received in a slot 17c of the member 17, the axis of the tool spindle 24, and so of the cutting tool 25, is caused to extend substantially at right-angles to the work-receiving member 11 to which the guide member 17 is fitted.

The jig so far described can be mounted in position for use by clamping it to any rigid support. In the example illustrated, the vertical work-receiving member 11 is provided with two G-clamps 26, 27 one at each side thereof. The clamp 26 is secured to the member 11 by means of two screws 28, whilst the clamp 27 is secured to the member 11 by a single screw 29 in order to enable the clamp 27 to be adjusted angularly, if desired. The clamps 26, 27 are shown in engagement with a portion of a suitable support 30, such as the end of the table or work bench.

Before describing the use of the jig, it may be mentioned that the pitch of the slots 17c is twice the distance between the centres of the locating holes 21 before referred to and that the workpiece receiving member 11 is also cast with a plurality of holes 11c which, whilst serving to lighten the member, may also assist in securing a workpiece thereto by permitting the passage of a work-clamping member through any of the holes. Similarly, the top plate 10b may be also cast with holes in a similar manner to that shown in the member 11.

In order to cut complementary dovetail tongues and grooves in two workpieces, to enable them to be subsequently jointed together with a dovetail joint, one workpiece A is clamped against the vertical work-receiving face 11a of the member 11 as by the use of one or more G-clamps generally designated C. In positioning the workpiece A, one of its edges will be placed in abutment with locating pegs 31 projecting from the front face 11a of member 11 and so that the top end of the workpiece lies in the plane of the work-receiving surface 10a of the table top 10b. The second workpiece B is placed on top of the work-receiving surface 10a of the table top 10b so that the end of the workpiece B, which overhangs the table top, abuts the edge of the surface of the other workpiece A, as shown in FIG. 1 and so that the workpiece B is off-set relatively to the workpiece A, through abutment with the locating studs 12 and by a distance equal to the distance between the centres of the locating holes 21, the locating studs 12 and 31, as viewed in FIG. 2, being spaced apart a lateral distance equal to the spacing of the holes 21. When the two workpieces A and B are clamped to the members 10 and 11, as by use of G-clamps C, the guiding member 22 carrying the rotating tool 25 can be passed down the series of slots 17c in order to cut complementary dovetail tongues and grooves in the two workpieces A and B.

As shown in FIG. 1, the extreme end of the cutting tool 25 stops short of the plane of the rear face of the workpiece A so that the dovetail tongues and grooves cut therein will not extend completely through the thickness of the workpiece A. However, it will be obvious that the cutting tool 25 may be axially adjustable in order to cut dovetail tongues and grooves through the full thickness of the workpiece A. When the cutting tool 25 has traversed each of the slots 17c, the wing nuts 19 are slackened off to permit the locating stud 21a to be released from a hole 21. The guide member 17 is then slid horizontally and the locating stud 21a positioned in the other locating hole 21. The guiding member 22 carrying the cutting tool 25 is again passed down each of the slots 17c in order to cut dovetail tongues and grooves in the workpieces A and B intermediate those cut by the tool 25 in the first position of the slotted member 17. Thus, the pitch of the tongues and grooves cut in the completed workpieces will be equal to the distance between the centres of the locating holes 21.

As before mentioned, the reason for spacing the slots 17c at twice the required pitch of the dovetail tongues and grooves provided in the completed workpieces is to ensure that there will be adequate interengaging bearing surfaces between the guiding member 22 and the guide member 17, or in other words, in order to provide adequate land at each side of the slots 17c for sliding engagement with the guiding member 22. It may be also mentioned again that when the workpiece B is positioned relative to the other workpiece A the workpiece B will be offset from the edge of the workpiece A, which abuts against the locating studs 31, by a distance equal to one pitch of the dovetail tongues and grooves. This ensures that when the workpieces A and B are subsequently jointed together with a dovetail joint, the adjoining edges of the workpieces will be flush with one another.

Figure 6:
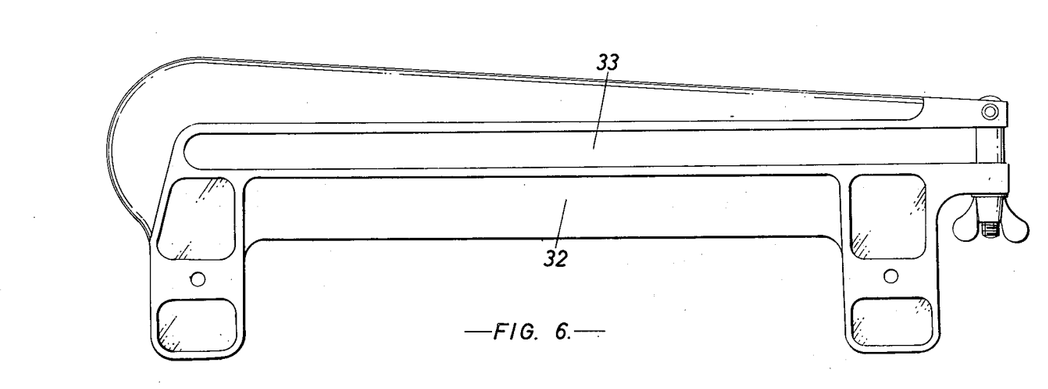
FIG. 6 is a side elevation of another form of guide member which can be used with the jig in place of the form of guide member shown positioned on the jig in FIGS. 1 to 3.

In cases where it is required to cut a single dovetail tongue and a corresponding groove in two workpieces to be jointed together, as may be used in the construction of shelving, the guide member 17 is removed from the positioning lugs 11b of the work-receiving member 11 and a guide member 32, shown in FIG. 6, is connected to the lugs 11b by the bolts 18 and wingnuts 19. When the guide member 32 is so positioned and a workpiece is appropriately clamped to the work-receiving member 11, it is possible to cut a dovetail groove in the workpiece by traversing the guiding member 22, carrying the rotating cutting tool 25, along the slot 33 in the guide member 32. It is also possible to form a corresponding tongue by clamping a second or co-operating workpiece on the top plate 10b and then adjusting its height so as to enable the cutting tool 25 when traversing the slot 33, to cut V-shaped grooves in opposite surfaces of the second workpiece; for instance, when the second workpiece is positioned on the table top 10b its height can be adjusted so that the rotating cutter 25 will cut a V-shaped groove in the top edge of the workpiece throughout the length thereof. The table top can then be raised to the required extent so that a similar groove can be cut in the underside of the workpiece by the rotating cutter 25 when the latter is traversing the guide slot 33. Thus, the two V-shaped grooves produce a dovetail tongue which is receivable in the corresponding groove cut in a workpiece by use of the guide member 32. Alternatively instead of moving the workpiece relatively to the single slotted guide member 32, the latter may have a vertical adjustment relatively to the lugs or bosses 11b of the member 11.

Reference will now be made to FIGS. 7 to 10 which illustrate the second embodiment of the invention. Since the construction and operation of the second embodiment are substantially similar to the first embodiment, as will be appreciated by use of the same reference numerals, only those parts of the second embodiment which have been modified will be described in detail in the following description.

Figure 9:
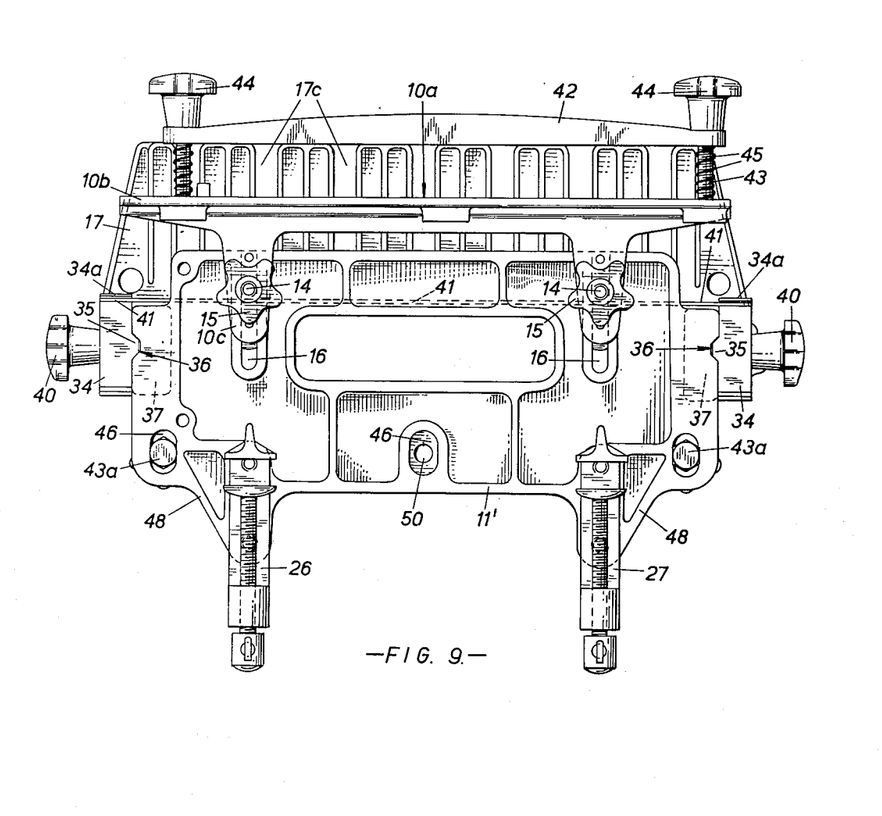
FIG. 9 is a corresponding rear view.
Figures 10, 12, 13, 17:
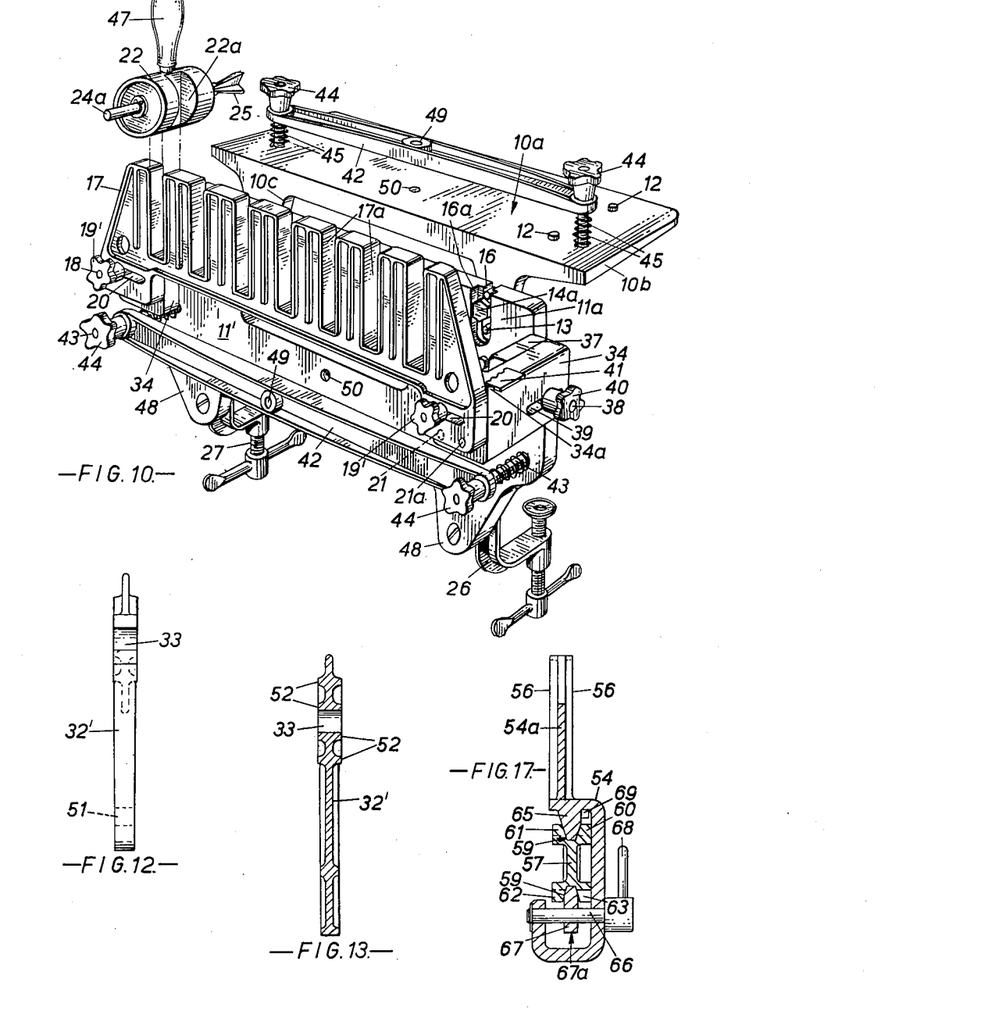
FIG. 10 is a corresponding perspective view as seen from the front of the jig.
FIG. 12 is a view looking at the right hand of FIG. 11.
FIG. 13 is a cross-section on line XIII—XIII, FIG. 11.
FIG. 17 is a cross-section on line XVII—XVII, FIG. 16.
Figures 11, 16, 18:
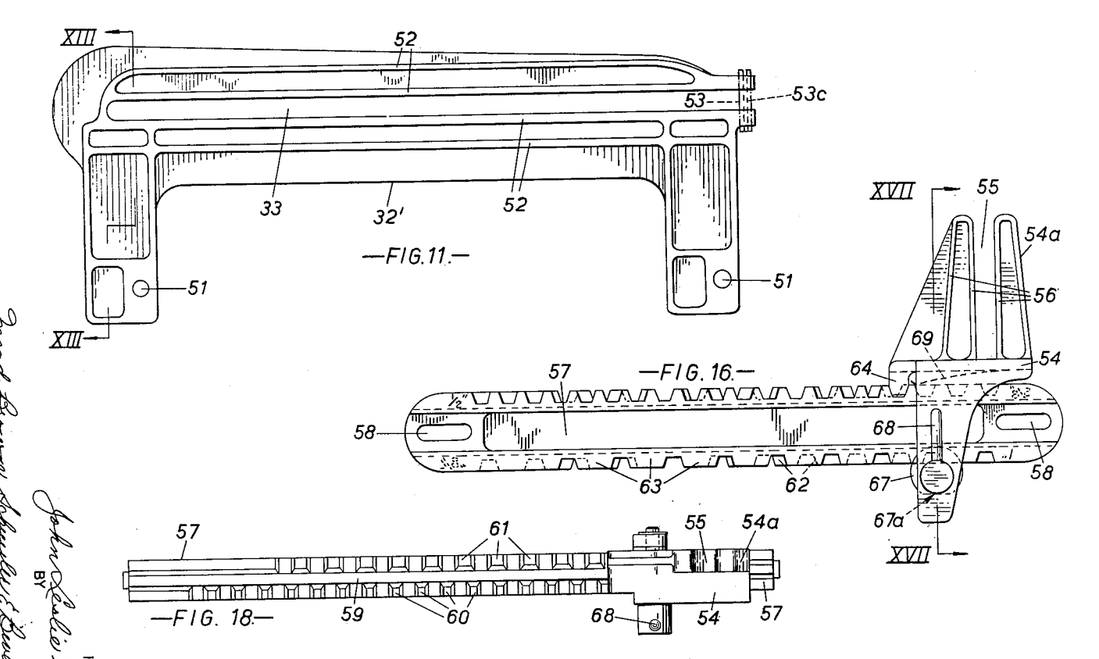
FIG. 11 is a side elevation of a guide member, similar to that shown in FIG. 6.
FIG. 16 is a side elevation of a multiple pitch guide member which can be used with the jig in place of the guide member shown fitted in FIGS. 1 to 3 or FIGS. 7 to 10.
FIG. 18 is a plan view of FIG. 17.

Referring to the jig assembly shown in FIGS. 7 to 10, to enable the guide member 17 or another guide member used in lieu thereof, such as that shown in FIG. 6, FIG. 11 or 16, to be horizontally adjusted towards or away from the workpiece support member 11', each lug or boss 11b, seen in FIGS. 1 and 2 of the previously described embodiment, is omitted and replaced by a member 34 which is of L-shape as seen in plan view. One arm of the L-shaped member abuts against the back of the guide member 17 and is clamped thereto by the bolt 18 which passes through the horizontal slot 20 as in the previously described embodiment. The other arm of the L-shaped member 34 has on the inside a horizontally extending projection 35, see FIG. 9, which is slidable in a corresponding guide channel 36 formed in the adjacent side of a lug 37 which is cast integral with, and extends forwardly from, the adjacent face of the workpiece support member 11'. The horizontal adjustment of the vertically extending guide member 17 with respect to the work support member 11' is determined by a bolt or screwed stud 38 which is anchored to the lug 37 and extends laterally therefrom to pass through a horizontal slot 39 provided in the arm of the L-shaped member 34 which carries the projection 35. It will thus be seen that the vertically disposed guide member 17 can be horizontally adjusted towards or away from the vertically disposed workpiece support member 11' by slackening off the hand-nuts 40 provided on the bolts 38 at each side of the jig, the extent of this horizontal adjustment being limited by the horizontal slots 39.

Figures 7, 14, 15:
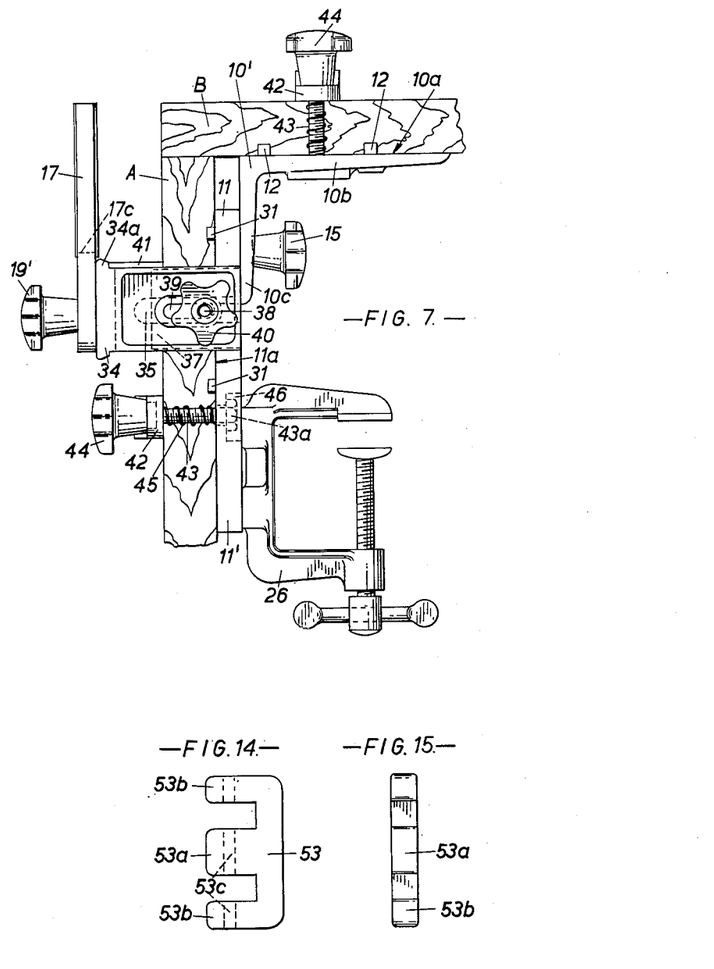
FIG. 7 is a side elevation of a jig according to a second embodiment of the invention.
FIG. 14 is a side elevation of an end piece for use with the guide member of FIG. 11.
FIG. 15 is an end view of FIG. 14.
Figure 8:
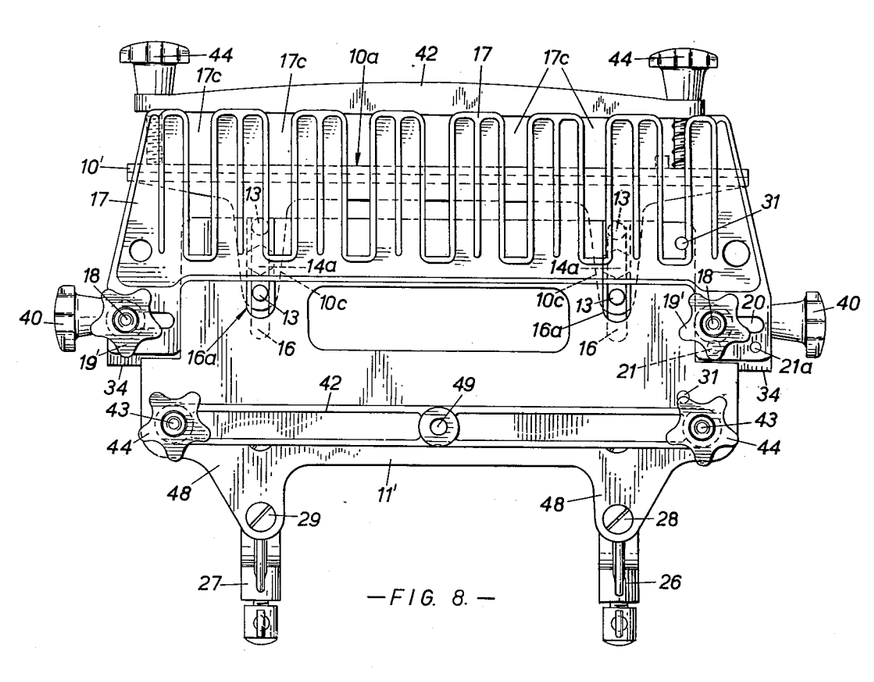
FIG. 8 is a corresponding front view.

The arm of each L-shaped member 34 which abuts the back of the slotted guide member 17 has a raised portion 34a, see FIGS. 7, 9 and 10 for abutment with a spacing bar 41. When the workpiece A is clamped to the support member 11', the slotted guide member 17 can be pushed rearwardly towards the workpiece A until the spacing bar 41 becomes tightly clamped between the abutments 34a and the adjacent face of the workpiece A, as shown in FIG. 7. When the guide member 17 has been horizontally adjusted in this manner, it can be locked in this position by tightening the hand-nuts 40. It will be appreciated by that the spacing bar 41 ensures that the same distance is maintained between the rear face of the guide member 17 and the front face of a workpiece A, irrespective of the thickness of the latter, thus ensuring that workpieces of varying thicknesses can be grooved to the same extent by the cutting tool 25.

In this second embodiment, the workpiece support members 10' and 11' are not formed with a plurality of holes 11c for permitting the passage of workpiece clamping members C as used in the previously described embodiment. In the second embodiment, the workpiece support members 10' and 11' are equipped with respective clamping bars 42 which are identical in construction. Each end of each bar 42 has a screw-threaded stud 43 which passes through a clearance hole formed in the bar 42 and is anchored to the respective work support member 10' or 11'. The free ends of the studs 43 are fitted with hand-nuts 44. The clamping bars 42 are biassed against the undersides of the hand-nuts 44 by means of coil springs 45 interposed between the work-receiving surfaces of the respective work support members 10' and 11' and the clamping bars 42.

FIG. 7 illustrates two workpieces A and B clamped to their respective workpiece support members 10' and 11' by the clamping bars 42. The head 43a of each stud 43 is received in an elongated counterbore 46 formed in the work support member. When the two workpieces A and B are clamped to the work support members 10' and 11', the guiding member 22 carrying the rotating cutting tool 25 is passed down the series of slots 17c in the guide member 17 in order to cut one series of complementary dovetail tongues and grooves in the two workpieces A and B, as previously described with reference to the embodiment of FIGS. 1 to 3. The hand-nuts 19' are then slackened off and the locating stud 21a released from one hole 21 to enable the guide member 17 to be slid horizontally. The locating stud 21a is then positioned in the other locating hole 21 and the hand-nuts 19' tightened preparatory to passing the guiding member 22 carrying the cutting tool 25 down the slots 17c in order to cut dovetail tongues and grooves in the workpieces A and B intermediate those cut by the rotating tool 25 in the first position of the guide member 17, as fully described in the said previous embodiment. The guiding member 22 is provided with a handle 47, as shown in FIG. 10, for use by an operator when traversing the guiding member 22 through the series of slots 17c.

In this particular embodiment, the work support member 11' is provided with two downwardly extending lugs 48 for carrying the respective G-clamps 26, 27. For forming dove-tail tongues and grooves in comparatively narrow pieces of wood, each clamping bar 42 is provided with an additional hole 49 (FIG. 10) in the middle of the bar in order to receive one of the screw studs 43 which may be anchored in a corresponding hole 50 provided in a workpiece support member 10' or 11' in line with the hole 49.

Referring now to FIGS. 11, 12 and 13, the guide member 32' shown in these figures is similar to that described and illustrated in FIG. 6 and can be used in place of the vertically slotted guide member 17 by passing the bolts 18 through the holes 51 and then replacing the hand-nuts 19'. In this particular embodiment, the guide member 32' is cast so as to provide spaced bearing ribs 52 above and below the horizontal slot 33 in order to ensure adequate interengaging bearing surfaces between the side walls of the grooves 22a in the guiding member 22 carrying the cutting tool 25 and the guide member 32' and at the same time to improve the rigidity of the guide member 32'. In order to prevent any tendency for the two arms of the guide member 32' to move towards or away from one another when the cutter carrying guiding member 22 is traversing the slot 33, the open end of the slot 33 is closed by an end piece 53, shown in chain-dotted lines in FIG. 11 and detached in FIGS. 14 and 15. This end piece 53 is applied laterally to the opening end of the slot 33 and so that its middle portion 53a engages tightly in the slot 33 and so that the outer portions 53b of the member 53 engage above and below the end flanges shown at the right-hand end of FIG. 11. To prevent inadvertent displacement of end piece 53, the portions 53a, 53b thereof are drilled at 53c to receive a detachable retaining pin or bolt. This end piece 53 dispenses with the use of the screw stud, distance piece and wing nut assembly shown in FIG. 6.

FIGS. 16 to 18 illustrate another form of guide member which can be attached to the vertically disposed workpiece support member 11 in lieu of the guide member 17, shown fitted in FIGS. 1 to 3 or FIGS. 7 to 10 or the guide member 32' described with reference to FIGS. 11 to 15.

The guide member of FIGS. 16 to 18 comprises a first member 54 having an upper part 54a provided with a single vertically extending slot 55 open at its top end so as to allow the guiding member 22 carrying the cutter 25 to be inserted through and down the slot. Both sides of the upper part 54a have raised ribs 56 to provide adequate interengaging bearing surfaces between the member 54 and the member 22 during a cutting operation. The member 54 is mounted for horizontal displacement upon a second member 57 in the form of a straight bar and which can be mounted on the jig of FIGS. 7 to 10, in place of the guide member 17, by use of the same studs 18 and hand-nuts 19', the studs passing through horizontal slots 58 provided one at each end of the bar 57. As is seen in FIG. 17, the bar 57 is of H-section to provide a guide channel 59 running along the top and bottom of the bar at the midwidth thereof and to provide spaced longitudinal edges at each side of the guide channels 59. The two top longitudinal edges of the bar 57 are provided with teeth designated 60 and 61 respectively, whilst the two bottom longitudinal edges of the bar 57 are also provided with teeth designated 62 and 63 respectively. In this particular embodiment, the series of teeth 60 are spaced at ½" pitch, the series of teeth 61 are spaced at ⅝" pitch, the series of teeth 62 are spaced at ⅞" pitch and the series of teeth 63 are spaced at 1" pitch. Any one of the series of teeth 60, 61, 62 and 63 are arranged to be engaged by a correspondingly shaped single tooth or projection 64 (FIG. 16) carried by the member 54. The member 54 also carries a key portion 65 (FIG. 17) which can be slidably engaged in one or other of the guide channels 59 according to which of these channels is in the upper position.

The member 54, as will be seen from FIG. 17, partly embraces the bar 57 at its lower end, and within this channelled part of the member 54 there is rotatably mounted a shaft 66 whereto is secured a cam 67 which can also be engaged in one or other of the guide channels 59. As is seen in FIG. 16, one side of the cam member 67 has a flat portion 67a and the shaft 66, together with the cam 67, is rotated by means of a handle lever 68. Interposed between the horizontally displaceable member 54 and the toothed bar 57 is a plate spring 69 which functions to raise the projection 64 out of engagement with any of the teeth of the bar 57 when the cam 67 is turned so that its flat part 67a is uppermost.

It will be appreciated that with this particular two-part guide member, dovetail grooves can be cut in workpieces at any one of the four pitches previously mentioned. If the two-part guide member is positioned on the jig of FIGS. 7 to 10 in the position in which it is illustrated in FIG. 16, then the guide member 54 can be moved tooth for tooth along the series of teeth 60 so as to cut dovetail grooves at ½" pitch in the two workpieces A and B. If it is required to cut dovetail grooves at any of the other pitches provided on the bar 57, then the latter can be turned upside down or end for end so as to bring the selected one of the series of teeth 61, 62 or 63 in line with the projection 64.

In carrying out a dovetailing operation with the use of this two-part guide member, the bar 57 is positioned on the work support 11 and is then adjusted horizontally relatively to the edge of the workpieces and in accordance with the pitch selected. The handle 68 is then turned so as to cause the cam 67 to draw the projection into the first tooth of the series of teeth selected, and then the guiding member 22 carrying the cutter 25 is passed down the vertical slot 55 of the member 54. When the first dovetail groove has been cut in the workpieces, the handle lever is rotated to turn the cam 67 so that its flat side 67a is uppermost and the projection 64 has moved out of engagement with the toothed bar. The member 54 is then slid horizontally by hand one pitch and the cam 67 is turned to lock the member 54 to the bar 57 preparatory to the next cutting operation. This sequence of operations can be performed tooth by tooth throughout the length of the bar 57.

It will be understood that the pitches described in the embodiment of FIGS. 16 to 18 are given by way of example only, and it will be obvious that the pitches of the teeth 60, 61, 62 and 63 can be varied to suit any particular requirements. It will also be understood that any other form of co-operating locating means and co-operating clamping means can be provided for locating the member 54 at any one of a number of substantially equally spaced localities along the toothed bar 57.

Reference will now be made to FIGS. 19 to 22 which, although embodying modifications to certain component parts, illustrate a jig which is of substantially similar form to that previously described with reference to FIGS. 7 to 10.

Figure 19:
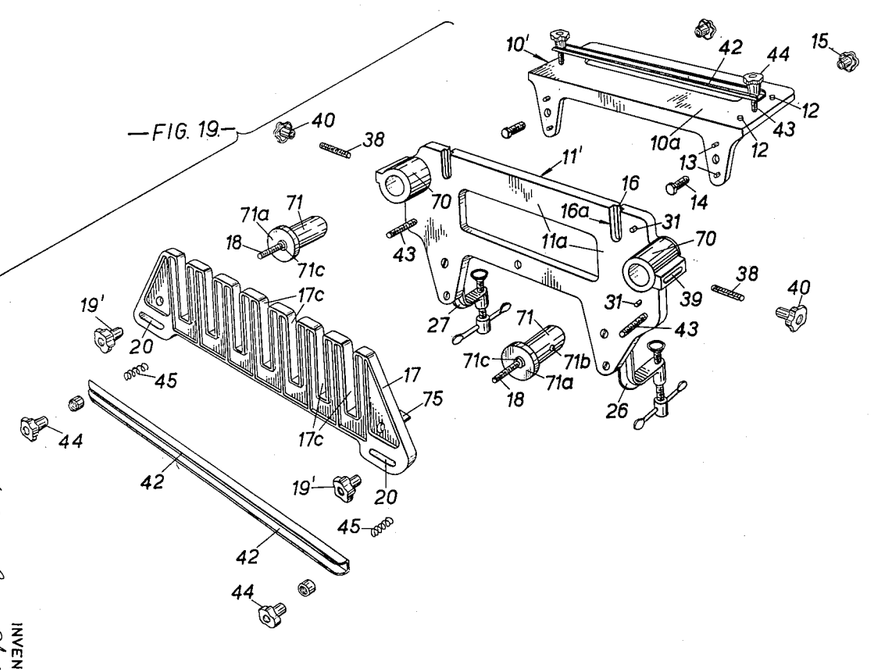
FIG. 19 is an exploded fragmentary perspected view of a further embodiment which is substantially similar to the jig of FIGS. 7 to 10 but which embodies modifications to certain component parts thereof.

Referring now more particularly to FIG. 19, the vertically disposed workpiece support member 11' has a pair of hollow guide members in the form of tubular bosses 70 cast integral with the member 11' and extending forwardly from the front work-receiving face 11a thereof, one boss 70 being provided at each side of the member 11' in place of the lugs 37 shown, for example, in FIGS. 9 and 10 of the previously described jig. Each boss 70 slidably receives a cylindrical spigot-like member 71 which has an enlarged head or flange 71a which is drawn tightly against the rear side of the slotted guide member 17 when the screw stud 18, secured to the member 71, is passed through the slot 20 in the guide member 17 and the hand nut 19 on the stud 18 is tightened. Horizontal adjustment of the slotted guide member 17 towards or away from the vertically disposed workpiece support member 11 is limited in one direction or the other by the screw studs 38. Each stud 38 has one end anchored in a screw tapped hole 71b in the respective spigot-like member 71, the stud 38 extending laterally from the member 71 through the slot 39 provided in the outer side of the corresponding tubular boss 70. The guide member 17 can be located in any horizontal position of adjustment by tightening the hand nuts 40. The cylindrical spigot-like member 71 dispenses with the use of the L-shaped members 34, shown in FIGS. 7 to 10 of the previously described embodiment.

As will be seen from FIG. 19, the flanges 71a of the member 71 are also formed with concentric projections 71c. The projection 71c on one member 71 is adapted to engage in or be released from one or other of a pair of corresponding recesses 73 (see FIG. 20) formed in the rear face of the guide member 17, one at each end of the slot 20, shown at the left hand end of FIG. 20. The projection 71c on the other member 71 is adapted to slide in a corresponding elongated recess 74, also formed in the rear face of the guide member 17 and which completely surrounds the other slot 20. It will thus be seen that when the hand nuts 19' are slackened off, the circular projection 71c, which has been engaged in one of the recesses 73, can be released to permit the guide member 17 to be displaced horizontally in a plane parallel with the workpiece support member 11' and relocked thereto in its other end position by insertion of the aligned projection 71c into the other of the recesses 73. This arrangement dispenses with the spaced holes and locating stud 21a embodied in the jig of the previously described embodiments.

Figure 20:
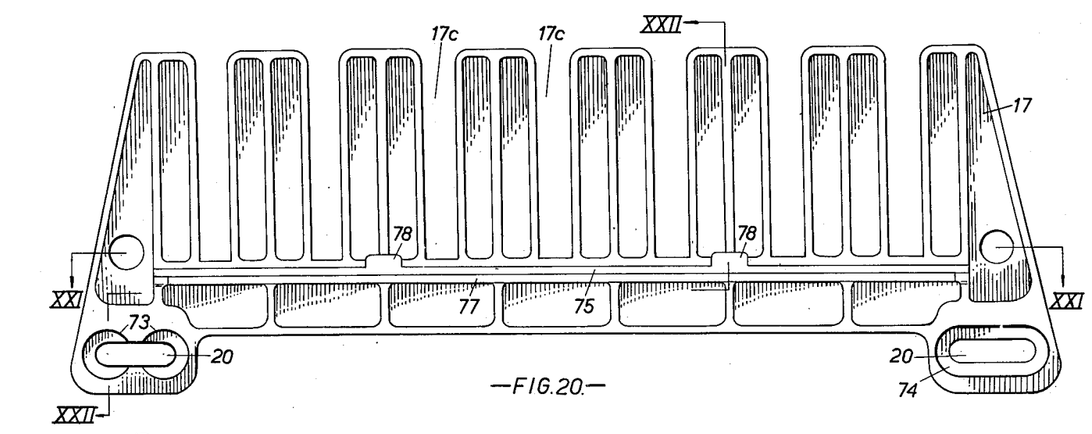
FIG. 20 is a rear view of the slotted guide member shown in FIG. 19.
Figure 21:
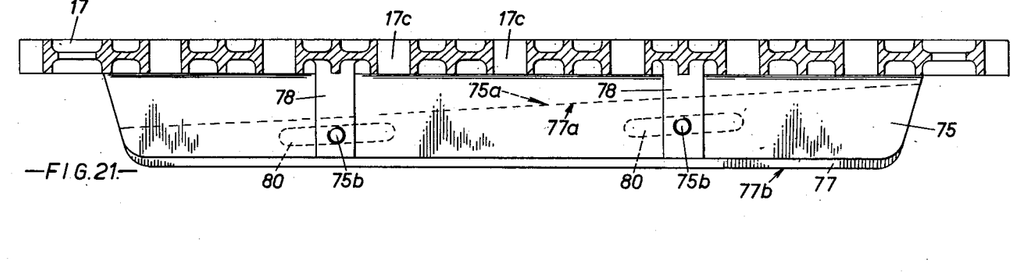
FIG. 21 is a sectional plan view taken on line 21—21 of FIG. 20.
Figure 22:
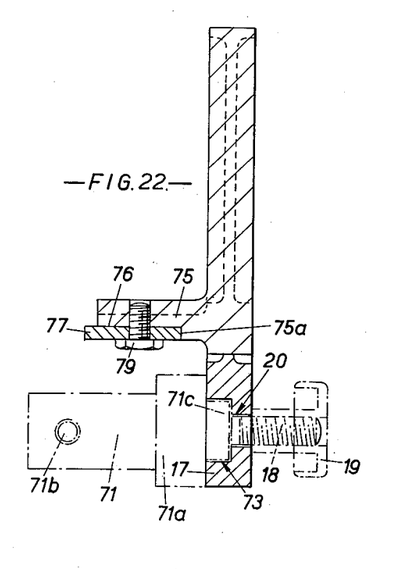
FIG. 22 is a cross-section taken on line 22—22 of FIG. 20.

Referring now to FIGS. 20, 21 and 22, the rear of the slotted guide member 17 has a ledge-like portion 75 extending rearwardly therefrom and cast integrally therewith. The projecting portion 75 extends horizontally across the guide member 17 and is disposed slightly below the closed lower ends of the slots 17c therein, as will be seen from FIG. 20. The underside of the projecting portion 75 is stepped, as shown at 76 in FIG. 22, and the formation of this step is such as to provide a tapered shoulder 75a which is inclined at an angle relatively to the plane of the guide member 17. Located within the stepped portion 76 of the projection 75 is a distance or spacing member 77 which has its inner edge 77a tapered to conform to and so as to bear against the mating tapered shoulder 75a of the projecting portion 75. The outer edge 77b of the spacing member 77 is parallel with the plane of the guide member 17. The top of the projecting portion 75 is provided with strengthening ribs 78 which are each drilled and tapped at 75b to receive a screw stud or bolt 79 which extends through slots 80 formed in the spacing member 77, said slots 80 being disposed at an inclination parallel with the angle of inclination of the mating surface 75a, 77a.

It will be appreciated that with this arrangement the parallel edge 77b of the spacing or distance member 77, which abuts against a workpiece when positioned on the work-supporting member 11' can be finely adjusted towards or away from the slotted guide member 17 by displacing the distance member 77 horizontally relatively to the guide member 17 when the studs or bolts 79 are slackened off. This feature enables the presetting of the slotted guide member 17 relatively to a workpiece when positioned on the workpiece support member 11', so as to compensate for any loss in length caused by regrinding of a cutting tool used with the jig, for example that shown at 25 in FIG. 10, thereby ensuring that the same depth of cut can be made in a workpiece by a reground cutting tool.

It will thus be appreciated that the present invention provides a simple and comparatively cheap jig apparatus whereby two or a pair of workpieces of wood can be dovetailed in a complementary fashion so as to be subsequently jointed to one another, whether employing a series of dovetail tongues and grooves or a single tongue and groove.

Although this invention has been described with reference to specific forms of the invention it will be appreciated that a wide variety of changes may be made without departure from the spirit or scope of this invention, for example, equivalent members or elements may be substituted for those specifically shown in the drawings, parts may be reversed, and certain features of the invention may be used independently of other features, all without departure from the spirit or scope of the invention as defined in the appended claims.

I claim:

1. In a jig assembly particularly applicable for the shaping of woodwork pieces by a portable hand tool said assembly comprising a pair of workpiece support members each having a workpiece receiving surface, means cooperating between said workpiece support members for assembling them together so that the workpiece receiving surfaces thereof extend in planes substantially at right-angles to one another, a guiding member having a tool holder journalled therein, a guide member having at least one slot for slidably receiving said guiding member, means for locating said slotted guide member in a given position relative to at least one of the workpiece support members; said guide member having a flat guide surface at each side, said flat surfaces being perpendicular to the walls of the slot therein and defining the thickness of the guide member through which the slot extends, means for spacing the guide member away from and with one of said flat surfaces lying in a plane substantially parallel to a plane containing the adjacent workpiece receiving surface, and said guiding member having oppositely directed grooves on either side of the rotational axis of the tool holder, the distance between the bases of the grooves being slightly less than the distance between the walls of said slot and the distance between the side walls of the grooves being slightly greater than the thickness of the guide member, whereby axial and tilting movement of the guiding member relatively to the guide member is restrained when the guiding member is applied to the guide member so that the grooves of the guiding member are in engagement with the slot of the guide member with part of the guiding member and tool holder lying between said one of the flat surfaces and said adjacent workpiece receiving surface, the tool holder being disposed with its rotational axis extending substantially normal to said one of the flat surfaces, and by relative movement of the guiding member and the slotted guide member, a rotating cutting tool carried by said tool holder can be moved along a given path in relation to a workpiece appropriately positioned on at least one of said workpiece receiving members to shape the workpiece in accordance with the configuration of said cutting tool.

2. In a jig assembly particularly suitable for the shaping of woodwork pieces by a portable hand tool, and embodying a pair of workpiece support members, having workpiece receiving surfaces extending substantially at right angles to one another, a guiding member having a tool holder journalled therein, and a guide member having at least one slot for slidably receiving said guiding member; said guiding member having two spaced grooves, one on either side of the rotational axis of the tool holder, said guide member having at least one pair of front and rear guide surfaces with said rear surface most closely adjacent said workpiece support members and at least one pair of surfaces therebetween defining a slot, the grooves being spaced from one another commensurately with the spacing of the corresponding guide member surfaces defining a slot, and being of width commensurate with the spacing of the corresponding front and rear guide surfaces, said guiding member being slidably receivable in said slot with part of the guiding member and tool holder lying behind the rear guide surface, and the rotational axis of the tool holder extending substantially normal to said rear guide surface and adjustable support means for locating the guide member in a given position spaced from the work-piece receiving surface of one of said work-piece support members such that the rear guide surface of the guide member lies in a plane substantially parallel to and spaced from a plane containing said workpiece receiving surface to an extent at least sufficient to permit the passage of the tool holder between the rear guide surface and any work-piece on said work support surface when said guiding member is slidably received in a slot.

3. A jig assembly particularly suitable for the shaping of woodwork pieces by a portable hand tool, comprising a pair of workpiece support members, each having a workpiece receiving surface which extends substantially at right angles to that of the other, a guiding member having a tool holder journalled therein, a guide member in the form of a comb having a plurality of spaced substantially parallel slots each of which may slidably receive the said guiding member, said guiding member having a pair of opposed substantially parallel spaced grooves, one on either side of the rotational axis of the tool holder, said guide member having front and rear guide surfaces adjoining the edges of each of said slots with said rear surface most closely adjacent said workpiece support members, said slots and said grooves being complementarily shaped relatively to one another, said guiding member when slidably received in one of said slots extending over and engaging at least marginal portions of said guide surfaces with part of the guiding member and tool holder lying behind the rear guide surface, and the rotational axis of the tool holder extending substantially normal to said rear guide surface, and support means for locating the guide member in a fixed position spaced from one of said workpiece support members such that the rear guide surface of the guide member lies in a plane substantially parallel to and spaced from a plane containing said workpiece receiving surface to an extent at least sufficient to permit that part of said guiding member and tool holder lying behind the rear guide surface when said guiding member is slidably received in one of said slots to pass between said rear guide surface and a workpiece on said work support surface.

4. A jig assembly particularly suitable for the shaping of woodwork pieces by a portable hand tool, comprising a pair of workpiece support members, each having a workpiece receiving surface which extends substantially at right angles to that of the other, a guiding member having a tool holder journalled therein, a guide member in the form of a comb having a plurality of spaced substantially parallel slots each of which may slidably receive the said guiding member, said guiding member having a pair of opposed substantially parallel spaced grooves, one on either side of the rotational axis of the tool holder, said guide member having front and rear guide surfaces adjoining the edges of each of said slots with said rear surface most closely adjacent said workpiece support members, said slots and said grooves being complementarily shaped relatively to one another, said guiding member when slidably received in one of said slots extending over and engaging at least marginal portions of said guide surfaces with part of the guiding member and tool holder lying behind the rear guide surface, and the rotational axis of the tool holder extending substantially normal to said rear guide surface, and support means for locating the guide member in an adjustable position spaced from one of said workpiece support members such that the rear guide surface of the guide member lies in a plane substantially parallel to and spaced from a plane containing said workpiece receiving surface to an extent at least sufficient to permit that part of said guiding member and tool holder lying behind the rear guide surface when said guiding member is slidably received in one of said slots to pass between said rear guide surface and a workpiece on said work support surface.

5. A jig assembly particulary suitable for the shaping of woodwork pieces by a portable hand tool, comprising a pair of workpiece support members, each having a workpiece receiving surface which extends substantially at right angles to that of the other, a guiding member having a tool holder journalled therein, a guide member in the form of a comb having a plurality of spaced substantially parallel slots each of which may slidably receive the said guiding member, said guiding member having a pair of opposed substantially parallel spaced grooves, one on either side of the rotational axis of the tool holder, said guide member having front and rear guide surfaces adjoining the edges of each of said slots with said rear surface most closely adjacent said workpiece support members, said slots and said grooves being complementarily shaped relatively to one another, said guiding member when slidably received in one of said slots extending over and engaging at least marginal portions of said guide surfaces with part of the guiding member and tool holder lying behind the rear guide surface, and the rotational axis of the tool holder extending substantially normal to said rear guide surface, a spacing member, means for adjustably mounting said spacing member relative to the rear guide surface of the guide member for abutment with a workpiece when positioned, and support means for locating the guide member in an adjustable position spaced from one of said workpiece support members such that the rear guide surface of the guide member lies in a plane substantially parallel to and spaced from a plane containing said workpiece receiving surface to an extent at least sufficient to permit that part of said guiding member and tool holder lying behind the rear guide surface when said guiding member is slidably received in one of said slots to pass between said rear guide surface and a workpiece on said work support surface.

6. A jig assembly particularly suitable for the shaping of woodwork pieces by a portable hand tool, comprising a pair of workpiece support members, each having a workpiece receiving surface which extends substantially at right angles to that of the other, a guiding member having a tool holder journalled therein, a guide member in the form of a comb having a plurality of spaced substantially parallel slots each of which may slidably receive the said guiding member, said guiding member having a pair of opposed substantially parallel spaced grooves, one on either side of the rotational axis of the tool holder, said guide member having front and rear guide surfaces adjoining the edges of each of said slots with said rear surface most closely adjacent said workpiece support members, said slots and said grooves being complementarily shaped relatively to one another, said guiding member when slidably received in one of said slots extending over and engaging at least marginal portions of said guide surfaces with part of the guiding member and tool holder lying behind the rear guide surface, and the rotational axis of the tool holder extending substantially normal to said rear guide surface support means for locating the guide member in an adjustable position spaced from one of said workpiece support members such that the rear guide surface of the guide member lies in a plane substantially parallel to and spaced from a plane containing said workpiece receiving surface to an extent at least sufficient to permit that part of said guiding member and tool holder lying behind the rear guide surface when said guiding member is slidably received in one of said slots to pass between said rear guide surface and a workpiece on said work support surface, said one of said workpiece support members having at each end thereof a tubular boss extending forwardly from the work receiving surface of that workpiece support member, said guide member having a spigot-like member at each end thereof slidable in one of said bosses, and clamping means for securing said spigot-like members in said bosses.

7. In a jig assembly particularly applicable for the shaping of woodwork pieces by a portable hand tool, said assembly comprising a pair of workpiece support members each having a workpiece receiving surface, means cooperating between said workpiece support member for assembling them together so that the workpiece receiving surfaces thereof extend in planes substantially at right angles to one another, a guiding member having a tool holder journalled therein, a guide member comprising a first member and a second member, said first member having a slot for slidably receiving said guiding member, means mounting the first member on the second member, adjustable means for adjusting the relative positions of the first and second members, means for locating said guide member in a given position relative to at least one of the workpiece support members, said first member having a flat guide surface at each side, said flat surface being perpendicular to the walls of the slot therein and defining the thickness of the first member through which the slot extends, means for spacing the guide member away from and with one of said flat surfaces lying in a plane substantially parallel to a plane containing the adjacent workpiece receiving surface, and said guiding member having oppositely directed grooves on either side of the rotational axis of the tool holder, the distance between the bases of the grooves being slightly less than the distance between the walls of said slot and the distance between the side walls of the grooves being slightly greater than the thickness of the guide members, whereby axial and tilting movement of the guiding member relatively to the guide member is restrained when the guiding member is applied to the guide member so that the grooves of the guiding member are in engagement with the slot of the guide member with part of the guiding member and tool holder lying between said one of the flat surfaces and said adjacent workpiece receiving surface, the tool holder being disposed with its rotational axis extending substantially normal to said one of the flat surfaces and by relative movement of the guiding member and the slotted guide member, a rotating cutting tool carried by said tool holder which can be moved along a given path in relation to a workpiece appropriately positioned on at least one of said workpiece receiving members to shape the workpiece in accordance with the configuration of said cutting tool.

8. A jig particularly applicable for the shaping of woodwork pieces by a portable hand tool comprising two workpiece support members each having a workpiece receiving surface which extends substantially at right angles to that of the other member, a guiding member having a rotatable tool holder journalled therein, a guide member having front and rear guide surfaces with the rear surface most closely adjacent said workpiece support members, means for supporting the guide member in a given position substantially parallel to and spaced from a plane containing the work supporting surface of one of said workpiece support members and any workpiece supported thereon, said guide member having at least one slot for slidably receiving said guiding member, said guiding member having two channel-shaped grooves, said grooves each having opposed substantially parallel surfaces for cooperating with the front and rear surfaces of the guide member and being disposed with the bases of the grooves substantially parallel to one another and on opposite sides of the rotational axis of the tool holder, said guide member having a pair of substantially parallel surfaces defining said slot, the spacing between said last-mentioned surfaces being commensurate with the spacing between the bases of the channels of the guiding members with part of the guiding member and tool holder lying behind the rear guide surface, and the rotational axis of the tool holder extending substantially normal to said rear guide surface.

9. In a jig particularly suitable for the shaping of woodwork pieces by a portable hand tool, and embodying a pair of workpiece support members having workpiece receiving surfaces extending substantially at right angles to one another, a guiding member having a tool holder journalled therein, a guide member having at least one slot with front and rear guide surfaces adjoining the edges of the slot, said rear guide surface being most closely adjacent said workpiece support members, said guiding member being slidably supported in the slot and having opposed substantially parallel surfaces engaging the front and rear guide surfaces of the guide member to restrain the guiding member against rotatable and tilting movement relative to the guide member with part of the guiding member and tool holder lying behind the rear guide surface and the rotational axis of the tool holder extending substantially normal to said rear guide surface, and support means for locating the guide member in a given position spaced from one of said workpiece support members such that the rear guide surface of the guide member lies in a plane substantially parallel to and spaced from a plane containing said workpiece receiving surface to an extent at least sufficient to permit said part of said guiding member and tool holder lying behind the rear guide surface, when said guiding member is slidably received in the guide member, to pass between the rear guide surface and a workpiece on said work support surface.

10. A jig particularly applicable for the shaping of woodwork pieces by a portable hand tool, and embodying a pair of workpiece support members having workpiece receiving surfaces extending at substantially right angles to each other, a guide member, means supporting the guide member in a position spaced from and substantially parallel to a plane containing the work supporting surface of one of the workpiece support members, a guiding member slidably supported on the guide member and having a rotatable tool holder journalled therein, a slot and groove connection between the guide member and guiding member, front and rear substantially parallel surfaces adjoining the edges of the slot, opposed substantially parallel surfaces defining the walls of the groove engaging said front and rear surfaces to restrain the guide member and guiding member against relative rotatable and tilting movement with part of the guiding member and tool holder extending into the space between the guide member and said plane containing the work supporting surface of said one of the workpiece support members for sliding movement in said space along a path defined by said slot and groove connection.

11. The construction defined in claim 1 in which the slot of said guide member is open at one end, and including a detachable end stop for the open end of the slot.

12. The construction defined in claim 9 in which the slot of said guide member is open at one end, and including a detachable end stop for the open end of the slot.

13. The construction defined in claim 7 in which said second member comprises a straight bar having a central channel in the upper and lower surfaces thereof, said first member having a key portion for optional engagement with one or other of said channels, each channel having spaced longitudinal edges having a series of spaced teeth, each of said series being of different pitch, said first member having a locating projection for optional engagement with one of said series of teeth, means for clamping said locating projection in any one of a number of substantially equally spaced positions along the second member by engagement between adjacent teeth of one of said series of teeth.

14. The construction defined in claim 10 in which the guide member comprises a first and second member, means mounting the first member on the second member, adjustable means for adjusting the relative position of the first and second members, said second member comprising a straight bar having a central channel in the upper and lower surfaces thereof, said first member having a key portion for optional engagement with one or other of said channels, each channel having spaced longitudinal edges having a series of spaced teeth, each of said series being of different pitch, said first member having a locating projection for optional engagement with one of said series of teeth, means for clamping said locating projection in any one of a number of substantially equally spaced positions along the second member by engagement between adjacent teeth of one of said series of teeth.

References Cited in the file of this patent

UNITED STATES PATENTS

| | | |
|---|---|---|
| 102,069 | Van Epps | Apr. 19, 1870 |
| 576,614 | Rickard | Feb. 9, 1897 |
| 1,459,534 | Hilker | June 19, 1923 |
| 1,506,154 | Berthelsen et al. | Aug. 26, 1924 |
| 1,651,510 | Carter | Dec. 6, 1927 |
| 2,751,945 | Beach | June 26, 1956 |
| 2,764,191 | Hartmann | Sept. 25, 1956 |
| 2,785,712 | Person | Mar. 19, 1957 |

FOREIGN PATENTS

| | | |
|---|---|---|
| 7,846 | Great Britain | 1887 |
| 67,459 | Switzerland | July 11, 1913 |
| 1,151,121 | France | Aug. 19, 1957 |

OTHER REFERENCES

American Machinist, Feb. 28, 1946.